(12) United States Patent
Shi et al.

(10) Patent No.: US 9,037,342 B2
(45) Date of Patent: May 19, 2015

(54) DETECTION APPARATUS

(75) Inventors: Junping Shi, Beijing (CN); Shangmin Sun, Beijing (CN); Jinning Liang, Beijing (CN); Quanwei Song, Beijing (CN); Yucheng Wu, Beijing (CN); Bin Hu, Beijing (CN); Yanjun Han, Beijing (CN); Xuejing Yang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 744 days.

(21) Appl. No.: 12/428,191

(22) Filed: Apr. 22, 2009

(65) Prior Publication Data
US 2009/0271068 A1 Oct. 29, 2009

(30) Foreign Application Priority Data
Apr. 29, 2008 (CN) .......................... 2008 1 0105430

(51) Int. Cl.
*G01V 5/00* (2006.01)
(52) U.S. Cl.
CPC .................................. *G01V 5/0008* (2013.01)
(58) Field of Classification Search
USPC ...................... 701/36; 378/57, 193, 197, 198
See application file for complete search history.

(56) References Cited

U.S. PATENT DOCUMENTS

| | | | | |
|---|---|---|---|---|
| 3,960,389 A | * | 6/1976 | Narahari | 280/86.5 |
| 4,685,527 A | * | 8/1987 | Oswald et al. | 180/14.3 |
| 4,730,685 A | * | 3/1988 | Sinkkonen | 180/14.7 |
| 5,692,028 A | * | 11/1997 | Geus et al. | 378/57 |
| 5,908,279 A | * | 6/1999 | Mote | 414/542 |
| 6,785,357 B2 | * | 8/2004 | Bernardi et al. | 378/57 |
| 6,843,599 B2 | * | 1/2005 | Le et al. | 378/198 |
| 6,892,839 B2 | * | 5/2005 | Cooper | 180/14.2 |
| 6,991,050 B1 | * | 1/2006 | Sanford et al. | 180/13 |
| 7,093,681 B2 | * | 8/2006 | Strain | 180/14.2 |
| 7,241,146 B1 | * | 7/2007 | Kim et al. | 439/34 |
| 7,352,843 B2 | | 4/2008 | Hu et al. | |
| 7,486,768 B2 | * | 2/2009 | Allman et al. | 378/57 |

(Continued)

FOREIGN PATENT DOCUMENTS

JP 2004-170393 6/2004

OTHER PUBLICATIONS

English translation of Korean Non-Final Office Action for Korean Application No. 10-2009-0037077, dated Mar. 18, 2011.

(Continued)

*Primary Examiner* — Nicholas Kiswanto
(74) *Attorney, Agent, or Firm* — Marshall, Gerstein & Borun LLP

(57) ABSTRACT

A detection apparatus comprises a freely-movable integral framework provided with front wheels and rear wheels, characterized in that, a control portion and a scan portion, and a driving mechanism driving said framework to move are provided on said framework, wherein said framework is provided with a first interface for connecting to external power, so that said detection apparatus is driven by external power via the driving mechanism to perform detection while conducting detection on site, and wherein the semitrailer for mounting the framework is provided with a second interface connectable to a traction apparatus so as to connect the detection apparatus and the traction apparatus while carrying out site-changing transportation. Said detection apparatus is not affected by the alteration of the emission standards, has low failure rate and maintenance cost, has zero emission in the detection state, and is pollution-free.

11 Claims, 1 Drawing Sheet

(56) References Cited

U.S. PATENT DOCUMENTS 7,769,133 B2 * 8/2010 Carver et al. ............ 378/57
7,845,286 B2 * 12/2010 Hu et al. ................. 104/162
8,215,436 B2 * 7/2012 DeGrave et al. ......... 180/165
2006/0056584 A1 * 3/2006 Allman et al. ............. 378/57

OTHER PUBLICATIONS

English translation of Korean Final Office Action for Korean Application No. 10-2009-0037077, dated Nov. 29, 2011.

* cited by examiner

DETECTION APPARATUS

CROSS-REFERENCE TO RELATED APPLICATIONS

This application claims the benefit of Chinese Patent Application No. 200810105430.4, filed Apr. 29, 2008.

TECHNICAL FIELD

The invention relates to a detection apparatus, and more specifically to a mobile container inspection system, in particularly a semitrailer vehicle-carried container radiation inspection system. The invention belongs to radiation detection fields and is adapted for large container detection.

BACKGROUND ART

In the prior art, dragging-type container inspection systems appeared from the beginning of 1990s, such as large container inspection systems produced by Heimann Corp., German and British Aerospace Corp. They are in an inspection passage being capable of shielding rays, and loaded with a radiation source, which is stationary and is capable of generating high-energy X-rays, and an array of detectors, which are capable of receiving X-rays penetrating a container. A vehicle loaded with a container is dragged through the inspection passage with a dedicated dragging apparatus. Such inspection systems are very bulk, and the floor space thereof corresponds to a soccer court. They suffer from the shortcomings of large floor space for civil construction, high system engineering fabrication cost, difficult to maintain, and unable to realize random inspections in different places.

For this reason, some manufacturers at home and abroad have currently developed various vehicle-carried mobile container inspection apparatuses. The present applicant filed a Chinese patent No. 99122363.2 on Nov. 5, 1999, the title of which is "a double-vehicle mobile container detection system using an accelerator as radiation source", wherein the detection system comprises an accelerator, a scan vehicle, and a control vehicle. The disclosure of this patent is incorporated herein by reference. It is characterized in that, a rotatable tray is mounted on a bracket of the scan vehicle, and on the tray are provided an electronic linear accelerator, a collimator acting as X-ray shielding, and a gantry frame formed by a vertical strut, a horizontal cantilever and a vertical cantilever provided with detectors. When performing detection, the control vehicle goes away from the detection site and controls the gantry frame to get in parallel across containers to be inspected.

This invention has the advantages of fast detection speed, clear imaged graphics, and the like.

Afterwards, the present inventors unified both the original scan vehicle and control vehicle into one vehicle based on the patent 99122363.2, wherein both the control apparatus and operator activity region on the original control vehicle are integrated onto the original scan vehicle. This technical solution has the advantages of relatively low system cost, flexibility and the like.

However, in said inspection system, with a detection apparatus mounted on an automobile chassis, the exhaust discharged by the vehicle will cause some pollution to the port while the scan vehicle carries the detection apparatus to move in the port or change site. With the global warm-up increasingly aggravating, requirements for automobile emissions are more and more strict. As emission requirements are elevated, existing vehicle-carried inspection systems have to make replacement to the whole set of apparatus. Furthermore, each apparatus needs to be equipped with at least a set of automobile chassis, rendering the manufacturing cost and maintenance cost relatively high.

SUMMARY OF THE INVENTION

In order to overcome the shortcomings existing in the prior arts, the object of the invention is to provide a vehicle-carried container inspection system which is not affected by the alteration of the emission standards, has low failure rate and maintenance cost, has zero emission and pollution-free in the detection state.

For several sets of inspection systems, operations in nearby fields, only one set of tractor may be prepared for the transportation of these inspection systems, and therefore such a technical solution saves cost to some extent.

The invention will causes the inspection systems to be manufactured independently without mounting and designing on the existing automobile chassis, and therefore will not be limited by said automobile chassis, lowering the system cost with the use of readily available framework such as common semitrailer, and increasing the universal capability of the inspection apparatus.

In order to achieve the above invention objects, the technical solution of the present invention is implemented as follows:

A detection apparatus, comprising:
a freely movable integral framework provided with front wheels and rear wheels,
characterized in that,
a control portion and a scan portion, and a driving mechanism for driving said framework to move are provided on said framework,
a first interface for connecting to external power is provided on said framework, so that said detection apparatus is driven by external power via the driving mechanism to perform detection while conducting detection on site.

Wherein said first interface is an interface for clean energy.

Said traction apparatus is a universal tractor chosen according to the emission requirements.

Said front wheel is a liftable steering axle.

Said driving mechanism is a friction-wheel driving system.

Said friction-wheel driving system includes a hydraulic cylinder, an electromotor and a friction-wheel, which are configured so that the friction-wheel is pressed tightly against the rear wheel or the front wheel of the framework while rendering the hydraulic cylinder to extend, and the external power drives the friction-wheel to rotate.

A rotatable tray is mounted on the framework, and the scan portion is mounted on said tray.

A control cabin is provided on the framework, and the control portion is arranged in said control chamber to control the scan portion, the driving mechanism and the travelling direction.

Said scan portion includes a liftable vertical strut, a transverse connecting rod on the vertical cantilever extending as a horizontal cantilever provided with detectors, and the horizontal cantilever is provided on the other end thereof with a hydraulically stretching cylinder, wherein the hydraulically stretching cylinder connects the vertical cantilever and the horizontal cantilever provided with detectors and can have the vertical cantilever being perpendicular to the horizontal cantilever or parallel with the horizontal cantilever, said scan portion further includes an electronic linear accelerator, the X-rays thereof always facing the vertical cantilever and the horizontal cantilever after they are perpendicular to each other, and a collimator acting as X-rays shielding is provided between the electronic linear accelerator and the vertical cantilever.

The present system may be used in containers, medium and small automobiles, passenger cars, unit load device and the like.

The following technical solution is readily obtained according to the above detection apparatus. Said framework may include a semitrailer currently available in the market, a carrying device which is easy to assemble and other devices having the characteristics defined by the invention. For the convenience of understanding, the semitrailer is illustrated as an example.

A semitrailer vehicle-carried container inspection system is mainly comprised of a tractor and a detection apparatus. The detection apparatus includes a semitrailer, a radiation source, a collimator, a vertical strut, a horizontal cantilever, a vertical cantilever, a hydraulically stretching cylinder connecting the horizontal cantilever and the vertical cantilever, a liftable steering axle, an operating cabin, a friction-wheel driving system and rotating bearings. The vertical strut, the horizontal cantilever, the vertical cantilever, and the operating cabin are mounted in the upper portion of the semitrailer, and the liftable steering axle, the friction-wheel driving system and the like are mounted at the bottom of the semitrailer. The friction-wheel driving system includes a hydraulic cylinder, an electromotor, a friction-wheel, and the like. The semitrailer vehicle-carried container inspection system is characterized in that, the detection apparatus is separated from the tractor, and when the emission standards are elevated, it is only necessary to replace the tractor portion separated from the detection apparatus, and the detection apparatus portion can still continue to work.

A semitrailer vehicle-carried container inspection system, characterized in that, in the transportation state, the hydraulic cylinder contracts, the friction-wheel is disengaged from the rear wheel of the semitrailer, and the tractor tracts the detection apparatus including the semitrailer to work; while in detecting, the semitrailer is separated from the tractor, the hydraulic cylinder of the friction-wheel driving system extends, pressing tightly the friction-wheel against the rear wheel of the semitrailer, the electromotor starts and brings the friction-wheel to rotate, and brings the rear wheel of the semitrailer to rotate by friction driving, thus driving the semitrailer to move along the direction of the detection passage. During the detection, the inspection system is electrically driven to conduct detection on the container or the vehicle, therefore realizes zero emission and pollution-free.

A semitrailer vehicle-carried container inspection system, characterized in that, a liftable steering axle is mounted in the front portion of a framework on the semitrailer, and is hydraulically controlled to lift and lower. In the travelling-on-road state in which the tractor is utilized to tract, the front steering axle may retract and lift-off; in the detection on site state, the steering axle drops down to the floor for supporting the detection apparatus and realizing steering and travelling functions, while in detecting, the semitrailer is operated by the operator to detect the object to be detected.

A semitrailer vehicle-carried container inspection system, characterized in that, the whole inspection apparatus is mounted on the semitrailer, omitting the traction device, thereby lowers the manufacturing an operating cost, lowers the failure rate of the apparatus, lowers the maintenance cost and improves the reliability of the apparatus; with omitting the traction device, the system volume decreases, lightening the weight thereof, and the driving force required during the detection decreases accordingly, therefore saving energy.

A semitrailer vehicle-carried container inspection system, characterized in that, a scan apparatus is mounted on the semitrailer, which has universal tractor interface, and is capable of being transported on the road by utilizing the tractor to tract; while in detecting, it no longer needs the tractor, therefore the semitrailer vehicle-carried container inspection system is self-propelled and gains high flexibility.

A complete system operation flow process is as follows: 1. the tractor tracts the semitrailer vehicle-carried container inspection system to the detection site; 2. the liftable steering axle of the semitrailer drops down to support the front portion of the semitrailer; 3. the tractor is disengaged from the semitrailer and leaves away, the detection apparatus being prepared for work; 4. the tray on the semitrailer turns 90 degrees, and a gantry frame is formed by the vertical strut, the horizontal cantilever and the vertical cantilever; 5. the hydraulic cylinder extends to press tightly the friction-wheel against the rear wheel of the semitrailer, and the electromotor runs to drive the rear wheel of the semitrailer; 6. the operator controls the travelling of the semitrailer to scan the container or vehicle to be inspected; 7. during scanning, the system orientation is adjusted by the liftable steering axle to ensure that the system can scan back and forth in a track with good coincidence; 8. the gantry frame retracts, the operator handles the semitrailer to the next detection region.

Compared with the prior arts, the invention has the following advantages: it is reasonable in design, zero emission, pollution-free, the inspection apparatus portion being independent of the emission standards; in the case that the emission standards are increasingly elevated, the tractor may be chosen according to the emission standards and the detection apparatus can still continue to use; it is self-propelled in the factory, has low manufacturing and maintenance cost, the failure of the vehicle itself has little impact on the apparatus, has high apparatus reliability; it is not only adapted for inspection of containers in the port, but also adapted for inspection of variable vehicle and goods.

DESCRIPTION OF THE DRAWINGS

The invention is further described in connection with the accompanying drawings and the following detailed description.

DETAILED DESCRIPTION OF THE PREFERRED EMBODIMENTS

Figure 1:
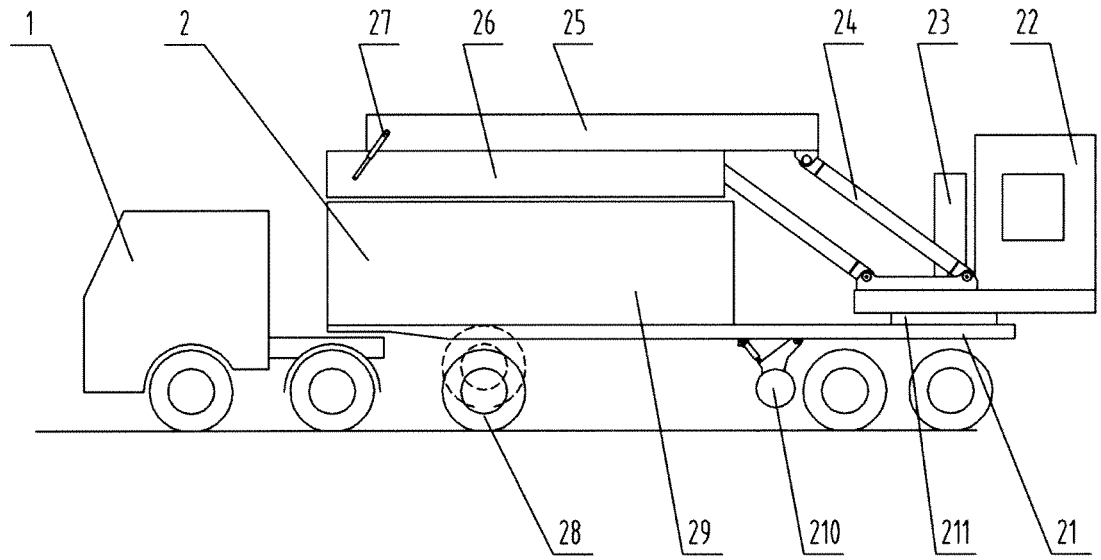
FIG. 1 is a structural diagram of the system.
Figure 2:
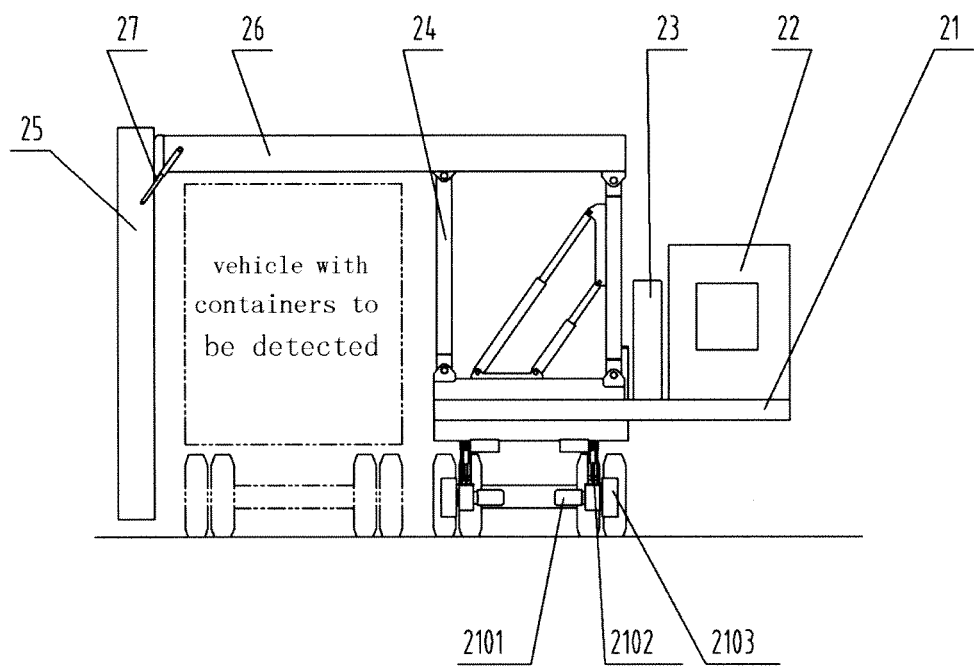
FIG. 2 is a structural diagram of the friction-wheel according to the invention.

The system illustrated in FIG. 1 is mainly composed of such as a tractor 1 powered by an internal combustion engine and a detection apparatus 2. The detection apparatus 2 includes a control portion and a scan portion, both of which are mounted on the bracket of the body. Wherein, the detection apparatus includes a semitrailer 21, a radiation source 22, a collimator 23, a vertical strut 24, a horizontal cantilever 25, a vertical cantilever 26, a hydraulically stretching cylinder 27 connecting the horizontal cantilever and the vertical cantilever, a liftable steering axle 28, an operating cabin 29, a friction-wheel driving system 210 and the like. The vertical strut 24, the horizontal cantilever 25, and the vertical cantilever 26 formed a gantry frame. The control portion includes the operating cabin 29 mounted in the upper portion of the semitrailer 21, and on the semitrailer 21 are further mounted the liftable steering axle 28, the friction-wheel driving system 210, a rotating bearing 211 and the like, wherein the friction-wheel driving system 210 includes an interface connectable to external power, such as an electromotor 2101 and similar clean power, a hydraulic cylinder 2102, a friction-wheel 2103, and the like.

In the semitrailer vehicle-carried container inspection system, the detection apparatus 2 is separated from the tractor 1, and when the emission standards are elevated, it is only necessary to replace the tractor 1 portion separated from the detection apparatus 2, and the detection apparatus 2 can still continue to work.

For the semitrailer vehicle-carried container inspection system, in the transportation state, the hydraulic cylinder 2102 of the friction-wheel driving system 210 contracts, the friction-wheel 2103 is disengaged from the rear wheel of the semitrailer, and the tractor 1 tracts the detection apparatus 2 including the semitrailer 21 to work, for example by towing pin provided on the semitrailer (or any other known connecting apparatus); while in detecting, the semitrailer 21 is separated from the tractor 1, the hydraulic cylinder 2102 of the friction-wheel driving system 210 extends, pressing tightly the friction-wheel 2103 against the rear wheel of the semitrailer 21. The electromotor 2101 starts and brings the friction-wheel 2103 to rotate, and thus brings the rear wheel of the semitrailer to rotate by frication driving, driving the semitrailer 21 to move along the direction of the detection passage. During the detection, the inspection system is electrically driven to conduct detection on the container or the vehicle, therefore realizes zero emission and is pollution-free.

The semitrailer vehicle-carried container inspection system is provided with the liftable steering axle 28 in the front portion of the framework on the semitrailer 21, which axle is hydraulically controlled to lift and lower. In the travelling-on-road state in which the tractor 1 is utilized to tract, the front steering axle 28 may retract and lift-off; in the detection on site state, the steering axle 28 drops down to the floor for supporting the detection apparatus and realizing steering and travelling functions, while in detecting, the semitrailer 21 is controlled by the operator to perform detection on the container or the vehicle.

For the semitrailer vehicle-carried container inspection system, the traction device is omitted while detecting, thereby lowers the manufacturing cost, lowers the failure rate of the apparatus, lowers the maintenance cost and improves the usability of the apparatus; with omitting the traction device, the system volume decreases, lightening the weight thereof, and the driving force required during the detection decreases accordingly, therefore saving energy.

For the semitrailer vehicle-carried container inspection system, the semitrailer has universal tractor interface, and is capable of being transported on the road by utilizing the tractor to tract; while in detecting, it no longer needs the tractor, and therefore the semitrailer vehicle-carried inspection system is self-propelled and gains high flexibility.

A complete system operation flow process is as follows: 1. the tractor 1 propels the detection apparatus to the detection site; 2. the liftable steering axle 28 in the bottom of the semitrailer 21 drops down to support the front portion of the semitrailer 21; 3. the tractor 1 is disengaged from the semitrailer 21 and leaves away, the detection apparatus 2 being prepared for work; 4. the rotating bearing 211 on the semitrailer 21 turns 90 degrees, and a gantry frame is formed by the vertical strut 24, the horizontal cantilever 25 and the vertical cantilever 26; 5. the hydraulic cylinder 2102 extends to press tightly the friction-wheel 2103 against the rear wheel of the semitrailer, and the electromotor 2101 runs to drive the rear wheel of the semitrailer; 6. the operator in the operating cabin 29 controls the liftable steering axle 28 to make the semitrailer 21 travel linearly, so as to scan the container or vehicle to be inspected; 7. the gantry frame retract, the operator drives the semitrailer to detect the next detection region.

According to the above technical solution, the object to be detected which is medium and small automobiles, passenger cars, unit load device (ULD) and the like in stead of container goods is still within the protection scope of the invention.

According to the above technical solution, the system which utilizes other driving means such as chain driving or gear driving and the like in stead of utilizing friction-wheel driving is still within the protection scope of the invention.

According to the above technical solution, the radiation source may be electronic linear accelerator, X-ray machine, radioactive isotopes, neutron source, laser and other optical source, which are all within the protection scope of the invention.

Utilizing an electromotor or hydraulic and the like as the driving means for powering the steering wheel or the rear wheel is also within the protection scope of the invention.

According to the above technical solution, the lifting of the steering axle may utilize any means, which are all within the protection scope of the invention.

What is claimed is:

1. A detection apparatus, comprising:
   a freely-movable integral framework provided with front wheels and rear wheels, the front wheels being liftable and steerable;
   a traction apparatus, which is connectable to the freely-movable integral framework for dragging the detection apparatus to a detection site, and which is separable from the freely-movable integral framework;
   a control portion and a scan portion, and a driving mechanism for driving said framework to move are provided on said framework, the driving mechanism propelling the freely-movable integral framework independently of the traction apparatus;
   a control cabin on the framework, the control portion including the control cabin, the control cabin controlling the scan portion, the driving mechanism, and the travelling direction of the freely-movable integral framework; and
   a first interface for connecting to external power is provided on said framework, so that said detection apparatus is driven to move by external power via the driving mechanism so as to perform detection while conducting detection on site.

2. The detection apparatus according to claim 1, wherein said first interface is an interface for clean energy.

3. The detection apparatus according to claim 2, wherein said traction apparatus is a universal tractor chosen according to the emission requirements.

4. The detection apparatus according to claim 1, wherein said front wheel is a liftable steering axle.

5. The detection apparatus according to claim 1, wherein said driving mechanism is a friction-wheel driving system.

6. The detection apparatus according to claim 5, wherein said friction-wheel driving system includes a hydraulic cylinder, an electromotor and a friction-wheel, which are configured so that the friction-wheel is pressed tightly against the rear wheel or the front wheel of the framework while the hydraulic cylinder is extended, and the external power brings the friction-wheel to rotate.

7. The detection apparatus according to claim 6, wherein a rotatable tray is mounted on the framework, and the scan portion is mounted on said tray.

8. The detection apparatus according to claim 1, wherein said scan portion includes a liftable vertical strut, a transverse connecting rod on the vertical strut extending as a horizontal cantilever provided with detectors, and the horizontal cantilever is provided on the other end thereof with a hydraulically stretching cylinder, and wherein the hydraulically stretching cylinder connects a vertical cantilever and the horizontal cantilever provided with detectors and have the vertical cantilever being perpendicular to the horizontal cantilever or parallel with the horizontal cantilever, said scan portion further including an electronic linear accelerator, X-rays thereof always facing the vertical cantilever and the horizontal cantilever after they are perpendicular to each other, and a collimator acting as X-rays shielding is provided between the electronic linear accelerator and the vertical cantilever.

9. A method of inspecting containers, medium and small automobiles, passenger cars, and unit load devices comprising scanning the container, medium and small automobile, passenger car, or unit load device using the detection apparatus of claim 1.

10. The method of inspecting containers of claim 9, further comprising:
- moving the framework to a detection site;
- dropping a liftable steering axle on the framework to support a front portion of the framework;
- disengaging the traction apparatus from the framework;
- turning a tray of the framework approximately 90 degrees;
- extending a hydraulic cylinder to press a friction-wheel against one of the front wheel and the rear wheel of the framework;
- running an electromotor to drive the friction-wheel, which drives one of the front wheel and the rear wheel, to move the framework to scan a container or a vehicle; and
- adjusting an orientation of the framework by using the liftable steering axle.

11. A detection apparatus, comprising:
- a freely-movable integral framework provided with front wheels and rear wheels, the front wheels being liftable and steerable;
- a traction apparatus, which is connectable to the freely-movable integral framework for dragging the detection apparatus to a detection site, and which is separable from the freely-movable integral framework;
- a control portion and a scan portion provided on the freely-movable integral framework, the control portion including an operating cabin mounted on the freely-movable integral framework;
- a driving mechanism for driving the freely-movable integral framework to move provided on the freely-movable integral framework the driving mechanism propelling the freely-movable integral framework independently of the traction apparatus; and
- a first interface for connecting to external power is provided on the freely-movable integral framework, so that the detection apparatus is driven to move by external power via the driving mechanism so as to perform detection while conducting detection on site,
- wherein the operating cabin controls the scan portion, the driving mechanism, and the travelling direction of the freely-movable integral framework.

\* \* \* \* \*